(12) United States Patent
Benner et al.

(10) Patent No.: US 6,568,861 B2
(45) Date of Patent: May 27, 2003

(54) FIBER OPTIC ADAPTER

(75) Inventors: Ryan T. Benner, Lancaster, PA (US); Gary Warner, Dillsburg, PA (US)

(73) Assignee: FCI Americas Technology, Inc., Reno, NV (US)

( * ) Notice: Subject to any disclaimer, the term of this patent is extended or adjusted under 35 U.S.C. 154(b) by 0 days.

(21) Appl. No.: 09/858,386

(22) Filed: May 16, 2001

(65) Prior Publication Data

US 2002/0172469 A1 Nov. 21, 2002

(51) Int. Cl.[7] .................................................. G02B 6/36
(52) U.S. Cl. ........................................................ 385/55
(58) Field of Search .............................. 385/53, 55, 60, 385/135, 136, 147; 439/559, 954

(56) References Cited

U.S. PATENT DOCUMENTS

| | | | | |
|---|---|---|---|---|
| 4,334,730 A | * | 6/1982 | Colwell et al. | 439/551 |
| 5,506,922 A | * | 4/1996 | Grois et al. | 385/75 |
| 5,818,992 A | * | 10/1998 | Aloisio, Jr. et al. | 385/76 |
| 5,825,955 A | * | 10/1998 | Ernst et al. | 385/79 |
| 5,923,805 A | * | 7/1999 | Anderson et al. | 385/86 |
| 6,027,252 A | * | 2/2000 | Erdman et al. | 385/76 |
| 6,220,763 B1 | * | 4/2001 | Stephenson | 385/73 |
| 6,254,278 B1 | * | 7/2001 | Andrews et al. | 385/53 |
| 6,364,537 B1 | * | 4/2002 | Maynard | 385/75 |
| 6,402,393 B1 | * | 6/2002 | Grimes et al. | 385/89 |

* cited by examiner

Primary Examiner—Lynn D. Feild
Assistant Examiner—Thanh-Tam Le
(74) Attorney, Agent, or Firm—Woodcock Washburn LLP

(57) ABSTRACT

A fiber optic adapter mountable through a panel opening on a panel for providing a shielded connection between at least two fiber optic connectors each having an associated fiber optic line. The adapter comprises a housing formed from a conductive material and includes a multi-part fitting that includes an alignment sleeve. Opposing parts of the fitting are mechanically coupled together. The adapter also comprises latching recesses on the housing for engaging the fiber optic connectors. The conductive material of the housing inhibits electromagnetic interference leakage through the panel opening.

23 Claims, 8 Drawing Sheets

FIBER OPTIC ADAPTER

FIELD OF THE INVENTION

The present invention relates generally to connectors or adapters. In particular, the present invention relates to fiber optic adapters for connecting fiber optic connectors.

BACKGROUND OF THE INVENTION

Fiber optic components transmit data signals in the form of light over a thin strand of glass. Data transmission by light has numerous advantages over data transmission using conventional means, such as, for example, transmitting electrical signals over copper wire. One major advantage of fiber optic transmission is the ability to transmit extremely large quantities of data over long distances without significant signal degradation. Conventional fiber optic cables, for which conventional "LC" connectors may be employed, are often less expensive and lighter than copper wire.

Electrical systems may be susceptible to electromagnetic interference (EMI). EMI may cause electrical equipment to malfunction, which, in turn, may cause unpredictable signal transmission and/or possible system failure. In order to prevent EMI disturbances, manufacturers often shield electrical equipment. Typically, shielding is accomplished by blocking electrical equipment from EMI using conductive metal enclosures or barriers. Such metal equipment may be impermeable to EMI and thereby protect the electrical components from the dangers of electromagnetic interference.

Even though fiber optic signals typically are not effected by EMI, fiber optic systems often employ electronic or other electrical equipment, or are used in conjunction or close to electronic components or circuits. Thus, in fiber optic systems, shielding may be generally beneficial to protect such electrical equipment or circuits from EMI interference. For example, metal plates may be inserted into a fiber optic adapter to prevent EMI leakage through an electrical panel on which the adapter is installed. U.S. Pat. No. 6,193,420, entitled "Shielded Optical Fiber Adapter,", discusses a metal plate inserted into an insulative or non-conductive adapter body. Such a configuration may, inter alia, add cost and/or additional steps in the manufacturing process of the adapter.

Another approach to forming an adapter for connecting fiber optic cables is discussed in U.S. Pat. No. 5,647,043, entitled "Unipartite Jack Receptacle"("Anderson"), which is incorporated by reference in its entirety. The Anderson reference discusses a jack that is formed of thermoplastic, and thus likely provides insufficient EMI shielding. Further, portions of the jack are coupled by employing pins disposed in corresponding holes in an interference fit, which would often be unsuitable or problematic for metal parts or other parts suitable for employing in an environment in which EMI shielding and inhibition of leakage is desired.

BRIEF SUMMARY OF THE INVENTION

The present invention satisfies the aforementioned need by providing a fiber optic adapter mountable through a panel opening on a panel. The adapter includes a housing that is formed from a conductive material, such that the conductive material of the housing prevents or inhibits EMI leakage through the panel opening.

In addition to the housing made from a conductive material, the fiber optic adapter of the present invention also comprises a housing defining at least a first and a second connector cavity, the first and second connector cavity being disposed on opposite ends of the housing and latching recesses on the housing for engaging the fiber optic connector.

According to another aspect of the present invention, a compressible conductive gasket is disposed on a mounting surface of the housing such that the gasket inhibits electromagnetic interference from leaking through the panel opening. Such a gasket is particularly useful if contact between the panel and the adapter mounting surface is imperfect, or becomes warped or bent, so as to allow a passageway for EMI to enter the panel opening via leakage.

According to another aspect of the present invention, a die cast adapter housing includes a frame post into which an alignment sleeve is inserted. An insert post is coupled to the frame post to retain the alignment sleeve. The posts may be coupled by mechanical or adhesive means. Preferably, fingers protrude through corresponding holes such that the ends of the fingers are deformed to form rivets coupling the posts together.

BRIEF DESCRIPTION OF THE FIGURES

Other features of the present invention are further apparent from the following detailed description of the embodiments of the present invention taken in conjunction with the accompanying figures, of which.

DETAILED DESCRIPTION OF PREFERRED EMBODIMENTS

According to an aspect of the present invention, a fiber optic adapter is mountable through a panel opening on a panel. A fiber optic adapter in accordance with an aspect of the present invention provides a shielded connection between at least two fiber optic connectors each having an associated fiber optic line. For example, a shielded fiber optic adapter in accordance with the present invention may be mounted in an electrical equipment panel opening for connecting together a fiber optic connector on the outside of the panel to a fiber optic connector on the inside of the panel.

Figure 1:
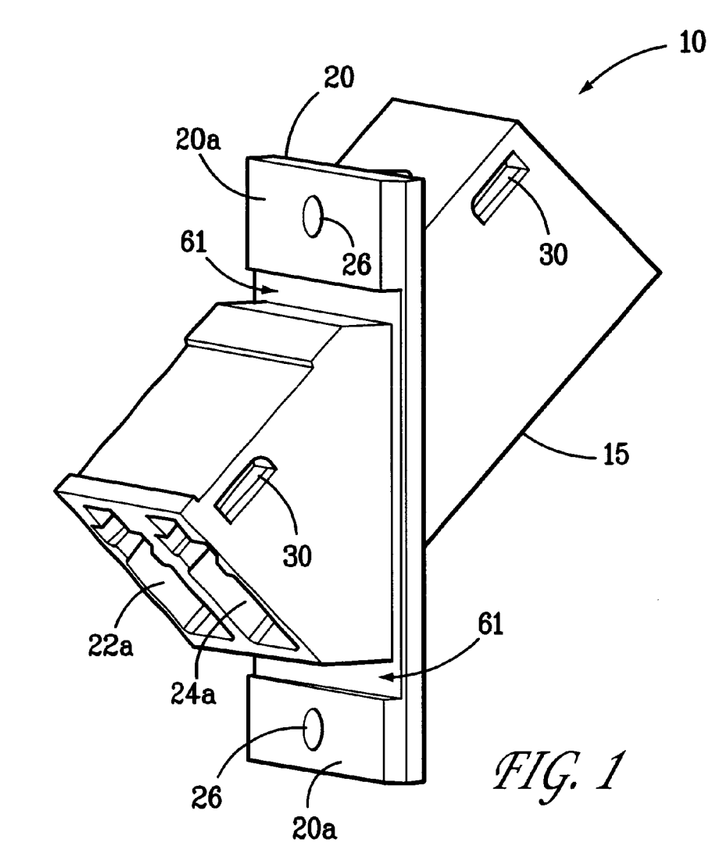
FIG. 1 is a perspective view of a fiber optic adapter in accordance with aspects of the present invention.

FIG. 1 illustrates a duplex fiber optic adapter 10 having a housing 15. The housing 15, in accordance with an aspect of the present invention, is formed from a conductive material.

The conductive material inhibits EMI from leaking through the panel opening (shown in FIG. 9) when the adapter 10 is mounted into such a panel opening. In one embodiment of the present invention, the conductive material comprises zinc, preferably formed by die casting. Preferably, the material in such an embodiment is a conventional ZAMAK 3™ or ZAMAK 7™, as will be understood by persons familiar with die casting materials. Other conductive materials such as copper or the like may be used without departing from the scope of the present invention.

Figure 2:
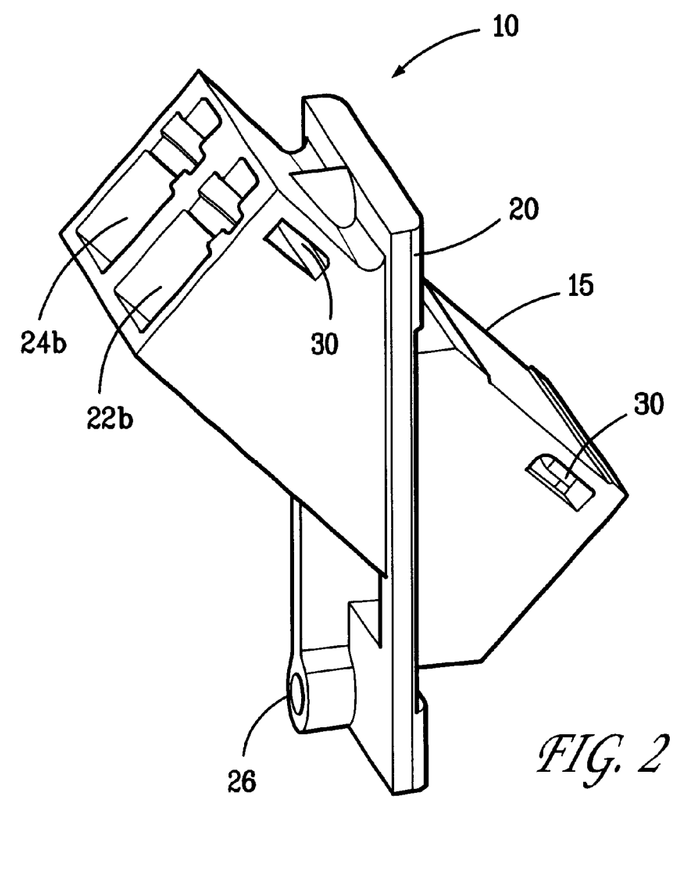
FIG. 2 is another perspective view of the fiber optic adapter of FIG. 1.

As shown in FIGS. 1 and 2, housing 15 defines at least a first cavity 22a and a second connector cavity 22b. First connector cavity 22a and second connector cavity 22b are disposed on opposite ends of the housing and are each formed to accept a conventional fiber optic connector 28 such that when each cavity accepts a fiber connector, the connectors are in communication. The adapter 10 preferably includes four connector cavities. Two connector cavities 22a and 24a are disposed at one end of the adapter and another two connector cavities (24a and 24b of FIG. 2) are disposed at the opposite end of the adapter. Each pair of connector cavities (22a, 22b and 24A, 24b) are formed such that each cavity accepts a fiber optic connector 28 (shown in FIG. 3). The fiber optic connectors may be of types known in the art. One exemplary type is standardized, and is generally described in U.S. Pat. No. 5,481,634, entitled "Connector For Optical Fiber," which is incorporated herein by reference in its entirety.

Figure 3:
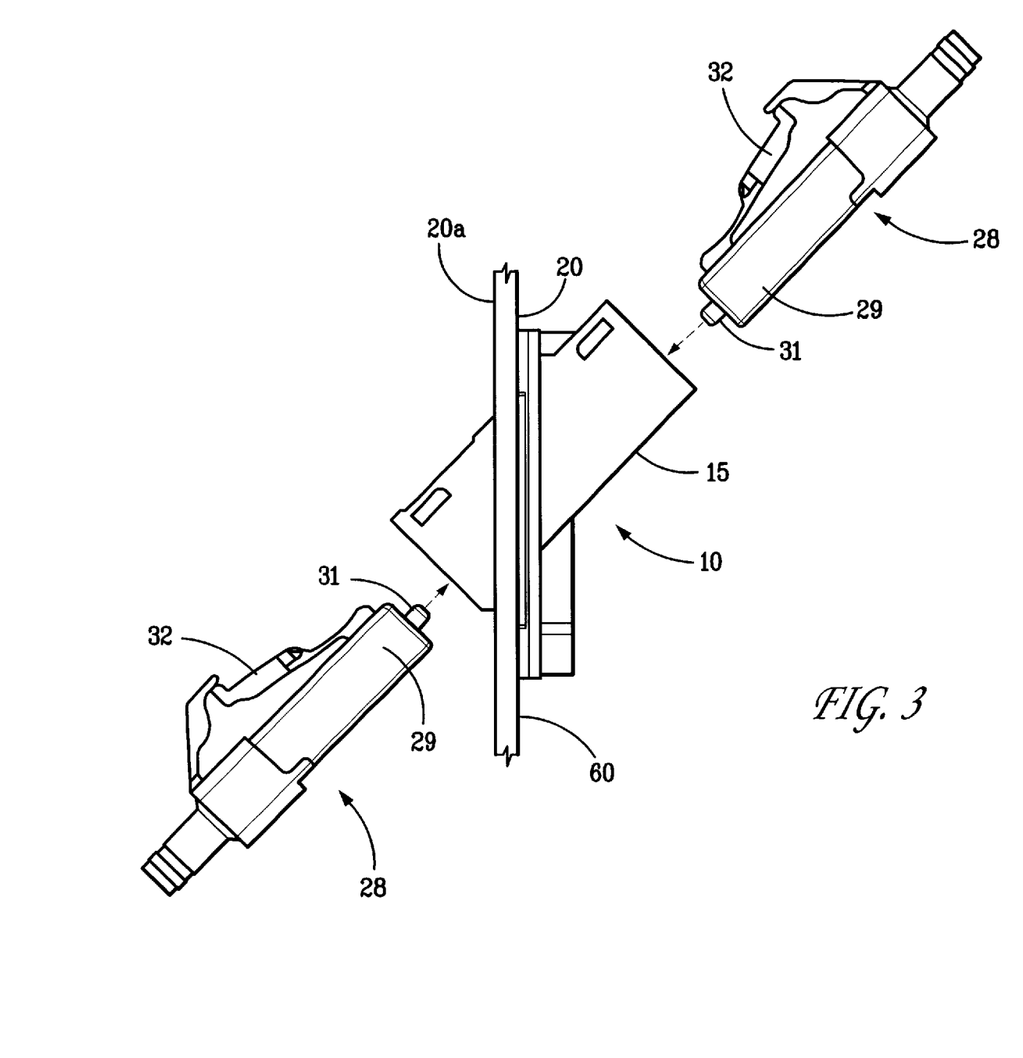
FIG. 3 is a diagrammatic side view of the fiber optic adapter of FIG. 1 illustrating fiber optic connectors being inserted into the adapter.
Figure 8:
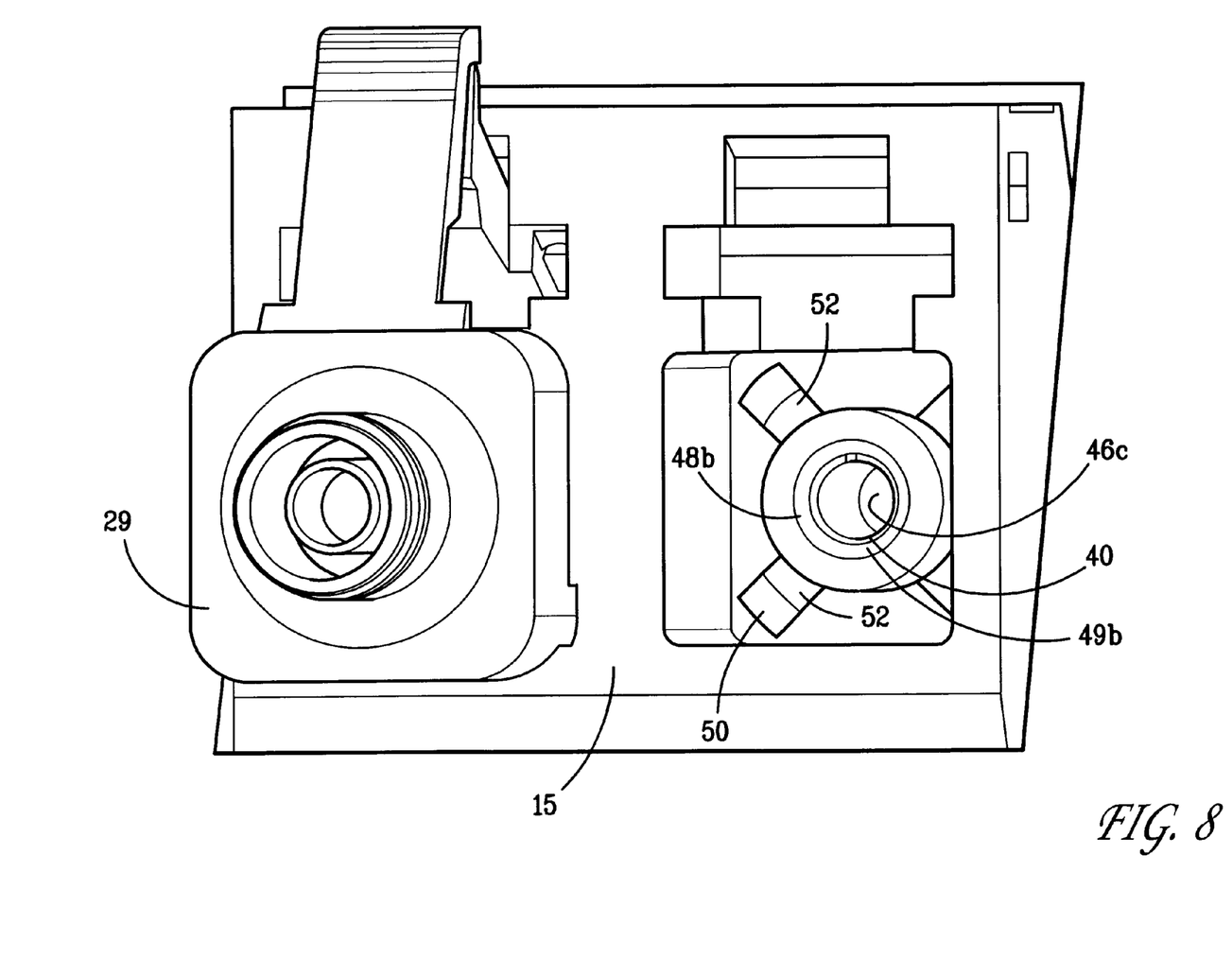
FIG. 8 is an enlarged perspective view of a portion of adapter shown in FIG. 1 including a fiber optic connector inserted into one of the cavities.
Figure 9:
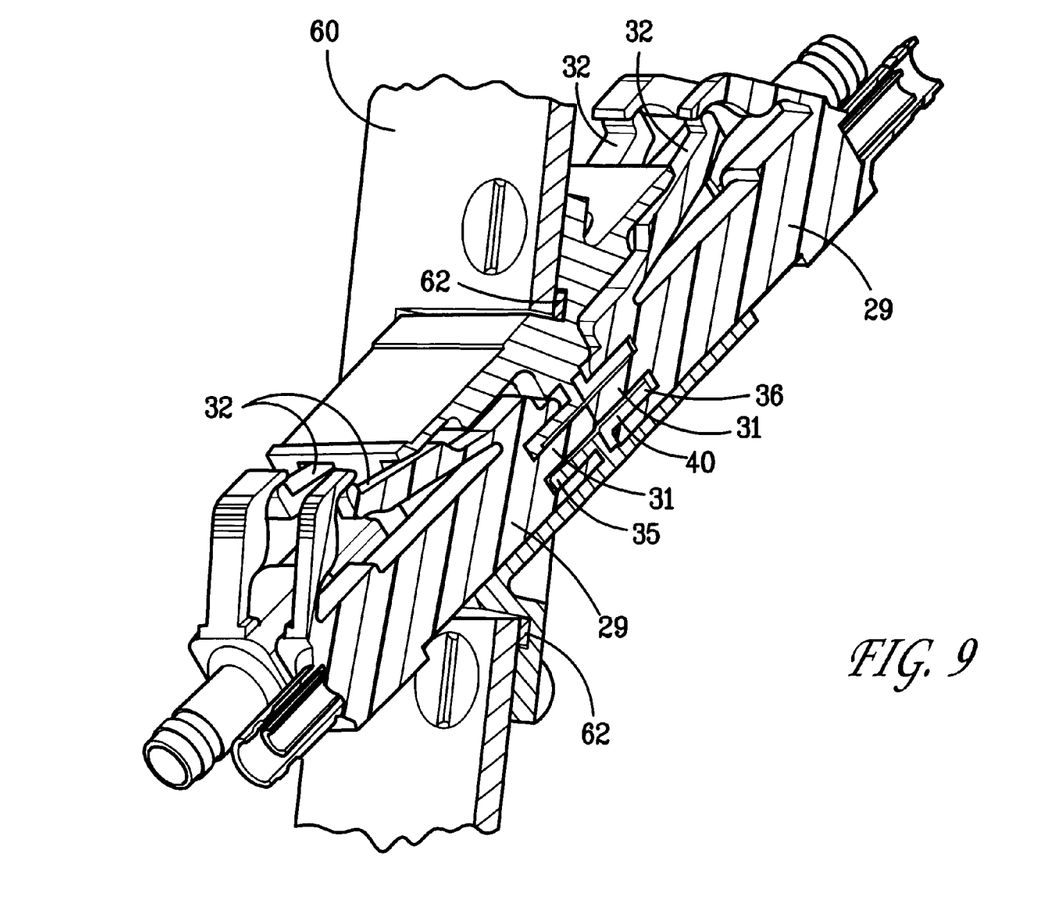
FIG. 9 is a sectional, perspective view of the adapter of FIG. 1 showing fiber optic connectors inserted into the adapter.

Each fiber optic connector 28 may communicate with the other fiber optic connector in the opposing paired connector cavity. Fiber optic connector 28 preferably is conventional, as will be understood by persons familiar with fiber optic connector technology. In this regard, as best shown in FIGS. 3, 8, and 9, each fiber optic connector 28 includes a body 29, a ferrule 31 that protrudes outwardly from body 28, and a mating mechanism or latch 32. Ferrule 31 may be spring loaded as in conventional LC connectors, or may be non-spring loaded. The outer diameter of ferrule 31 preferably has a tight tolerance to facilitate proper alignment thereof, as explained more fully below.

Fiber optic adapter 10 also includes latching recesses 30 on the housing 15 of the adapter 10. The latching recesses 30 are formed to engage the fiber optic connector by accepting mating latch 32. As such, the latching recesses 30 aid the connector cavities in holding or engaging the fiber optic connector 28. As shown in FIG. 1, the latching recesses 30 are apertures that extend through the wall of the housing. In particular, the latching apertures 30 in FIG. 1 and FIG. 2 are formed on each of the first connector cavity and second connector cavity 22a, 22b, 24a, and 24b. Such arrangements are conventional and are shown in the above-mentioned U.S. Pat. No. 5,481,634.

Fiber optic adapter 10 also includes a flange 20 that includes a mounting surface 20a, which enables the adapter 10 to be coupled to an electrical panel 60, as generally shown in FIGS. 3 and 9. The adapter is preferably oriented such that the cavities 22a, 22b, 24a, and 24b are angled relative to the panel and mounting surface. Because the laser light transmitted by the fiber optic connectors may cause retina or related eye damage, the side of the adapter outside the panel (that is, the right side of the adapter as oriented in FIG. 3) may be oriented relatively downwardly, preferably at 45 degrees to the plane of the panel, so as to avoid inadvertent retinal damage. Further, orienting the adapter at a 45 degree angle diminishes the horizontal dimension of protrusions from the inside and outside surface by, for example, enabling use of a 45 degree connector boot rather than a 90 degree connector boot.

As shown in FIG. 1, mounting flange 20 includes two fastening apertures 26 that are adapted to receive a fastening means or fasteners in order to couple the adapter and the panel together. The fasteners also provide the force to compress a gasket, as described more fully below. Such fastening means may include screws, rivets, pins or the like without departing from the present invention.

FIG. 2 is a perspective view of the fiber optic adapter in accordance with an aspect of the present invention. FIG. 2 shows connector cavity 22b and 24b, which are positioned opposing the connector cavities 24a and 22a of FIG. 1. FIG. 3 illustrates the fiber optic connectors about to be inserted into the fiber optic adapter 10, as well as a panel 60 and adapter 10 mounted thereto. Panel 60 may be a panel of a piece of equipment or any other panel without departing from the scope of the present invention. FIG. 3 shows the adapter 10 at a 45 degree angle in relation to the plane of the panel 60 and the mounting surface 20.

According to another aspect of the present invention, a gasket 62 formed of a conductive material is disposed between a recessed surface 61 of the flange 20 and panel 60. Preferably, the recess 61 (as best shown in FIG. 1) is formed in flange 20 for receiving gasket 62. Disposing gasket 62 in recess 61, compared with inserting a sheet of gasket material between mounting surfaces 20a of flange 20 and panel 60, enables control of the amount of compression of gasket 62, relieves uneven stress on the flange 20 and/or panel 60, and diminishes the likelihood of over-torque of threaded fasteners.

Gasket 62 serves to inhibits electromagnetic interference from leaking between the mounting surface and the panel. Under ordinary conditions (that is, for surfaces of flange 20 and panel 60 manufactured according to conventional processes), gasket 62 may produce beneficial shielding or inhibition of leakage between surfaces 20 and 60, and such shielding or inhibition is especially beneficial in circumstances in which the panel 60 and/or mounting flange 20 are deformed, warped, have burrs, or are otherwise not effectively flat and smooth, in which electrical systems or circuits are especially sensitive, or in which EMI is high.

Gasket 62 preferably is of the type that is compressible such that its shielding properties are enhanced upon compression. For example, the gasket may be formed of a compressible elastomeric material including conductive (or otherwise shielding) particles that may provide a barrier to EMI leakage upon compression of the compressible material. An example of such a material includes a silicone elastomer filled with nickel coated graphite carbon particles. Such gasket material may be as supplied by under the tradename NC-CONSIL™, by TECHNIT™ Company, was will be understood by persons familiar with such EMI shielding materials. Persons familiar with such shielding gaskets in light of the present disclosure will understand that the present invention encompasses any gasket that inhibits EMI leakage between flange 20 and panel 60.

Figure 6:
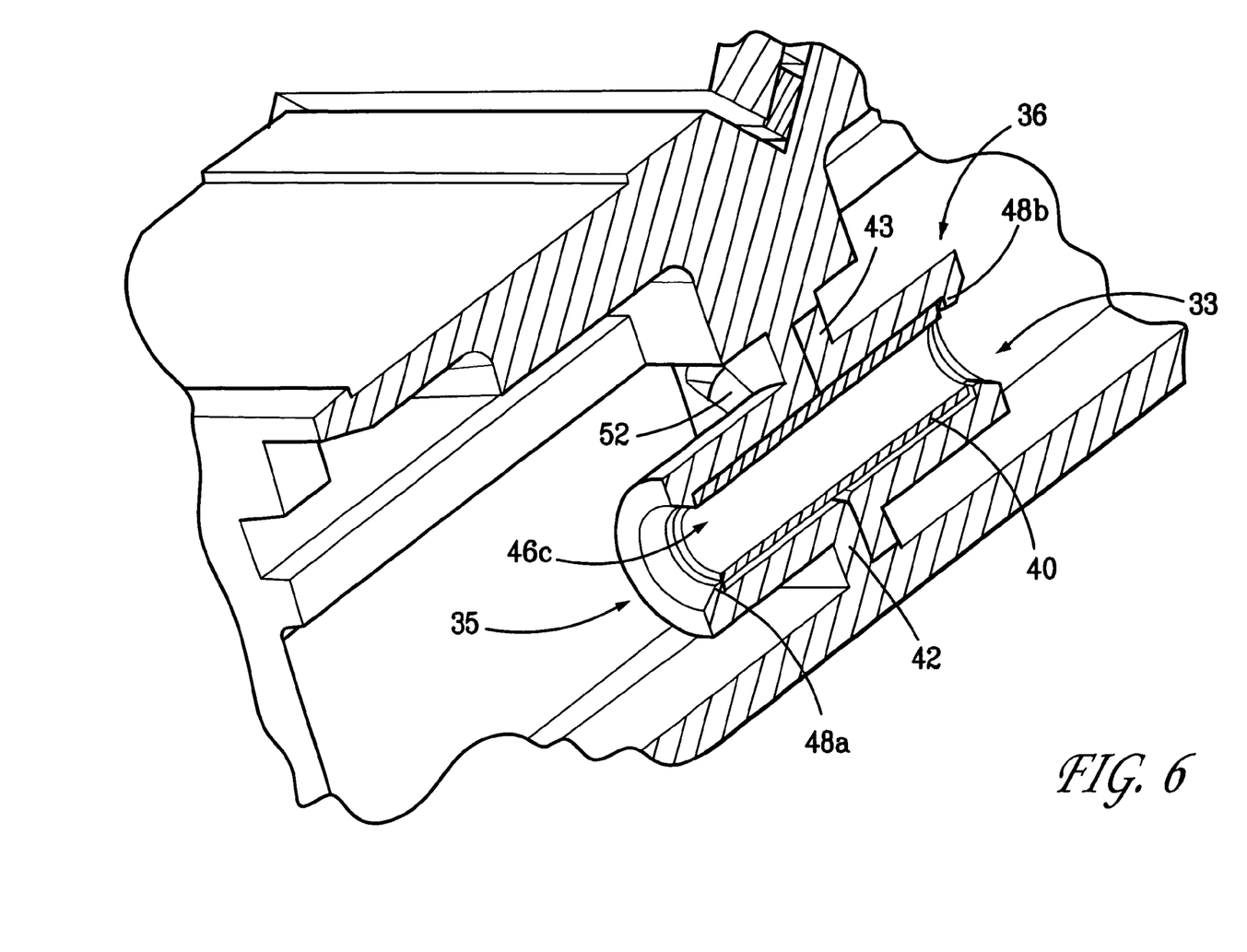
FIG. 6 is an enlarged, sectional, perspective view of a portion of the adapter shown in FIG. 4 in an assembled state.
Figure 7:
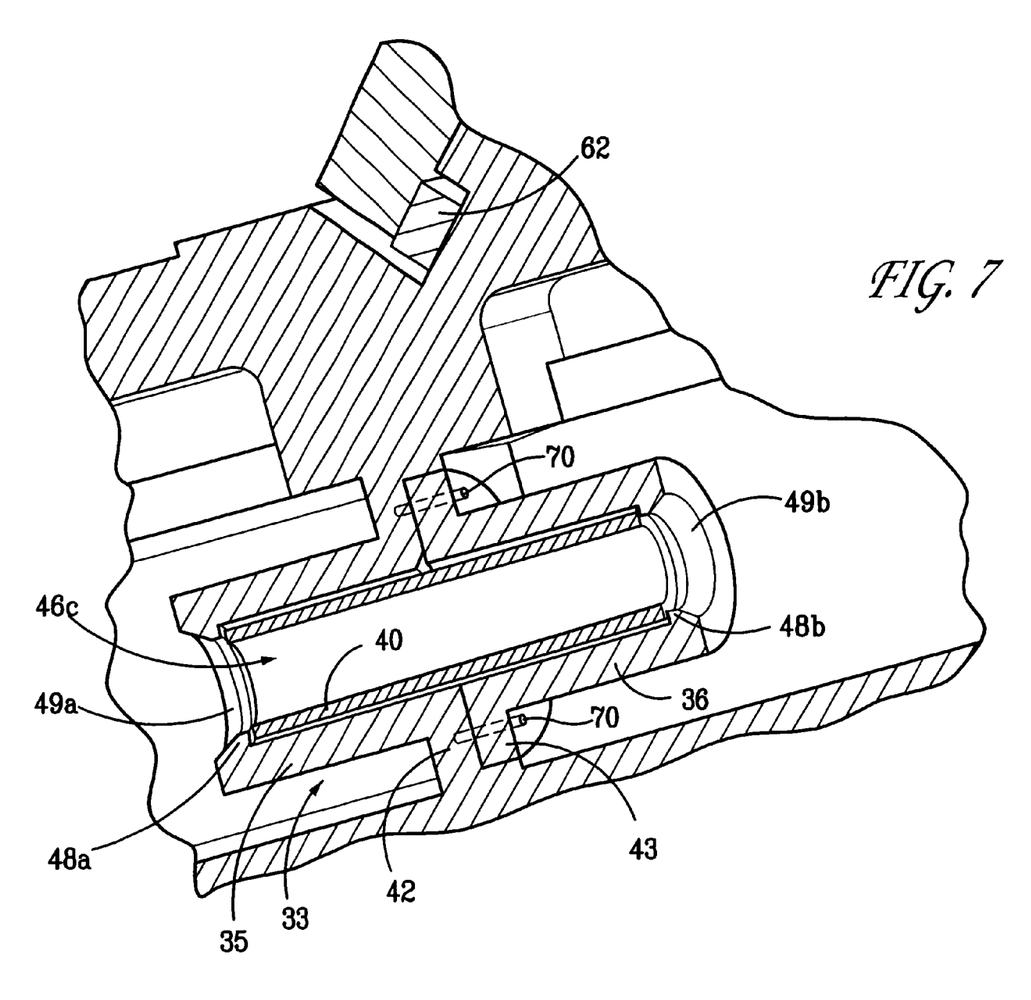
FIG. 7 is another enlarged sectional, perspective view of a portion of the adapter shown in FIG. 4 in an assembled state.

According to another aspect of the present invention, adapter 10 includes a multi-part fitting 33 for receiving a pair of opposing fiber optic lines that are associated with the fiber optic connectors 28, as best shown in FIGS. 6, 7, and 9. Fitting 33 includes a frame post 35, an insert post 36, and an alignment sleeve 40. In this regard, housing 15 includes an internal flange 42 that protrudes from a sidewall of housing 15 into and between cavities 22a and 22b (as well as another flange—also referred to by the reference numeral 42 for clarity and simplicity—into and between cavities 24a and 24b). Frame post 35, which is coupled to and supported by internal flange 42, includes a cylindrical sidewall 44a, a retainer 48a, and a landing or seat 45.

Figure 4:
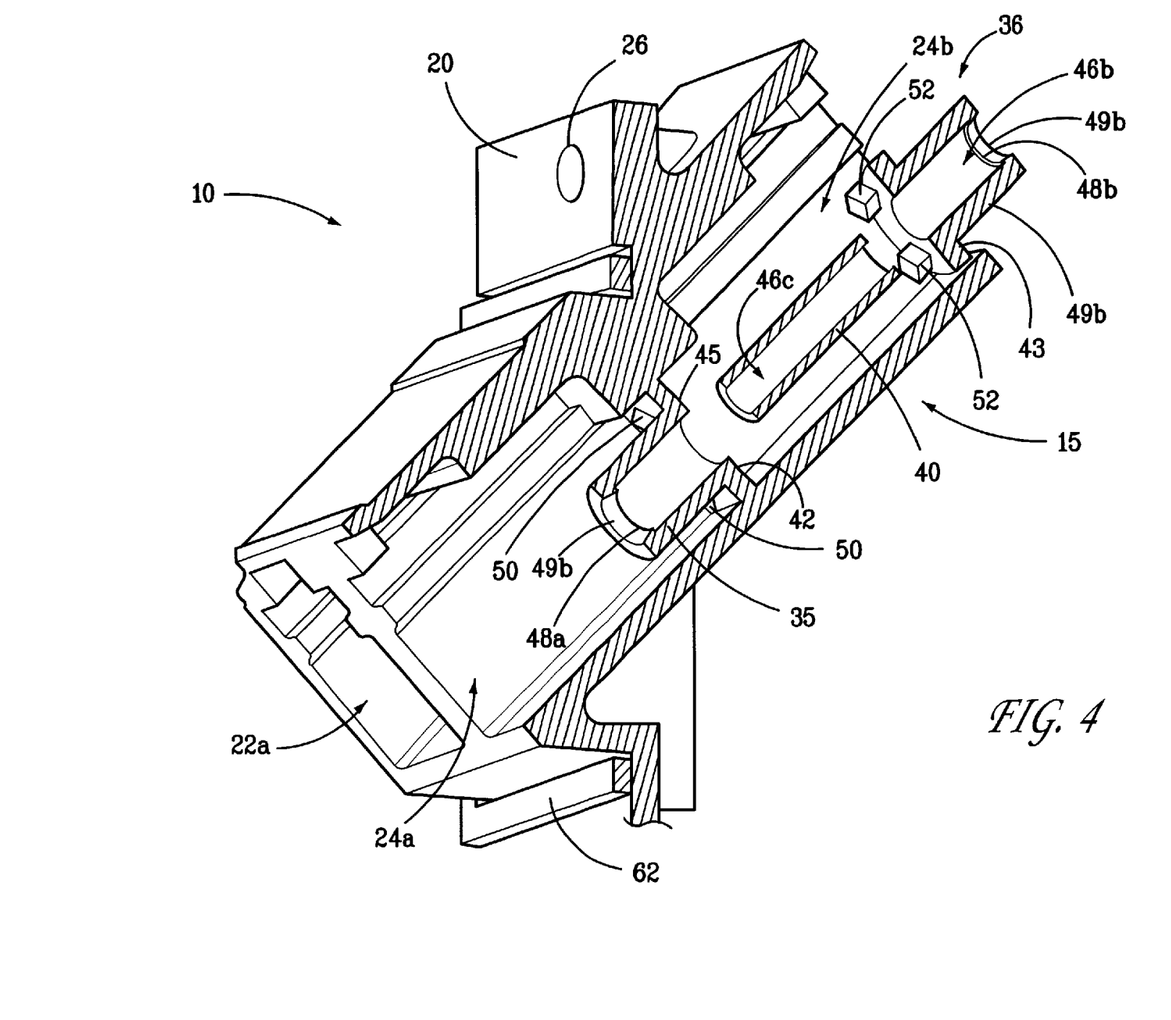
FIG. 4 is a sectional, exploded, perspective view of the fiber optic adapter of FIG. 1.
Figure 5:
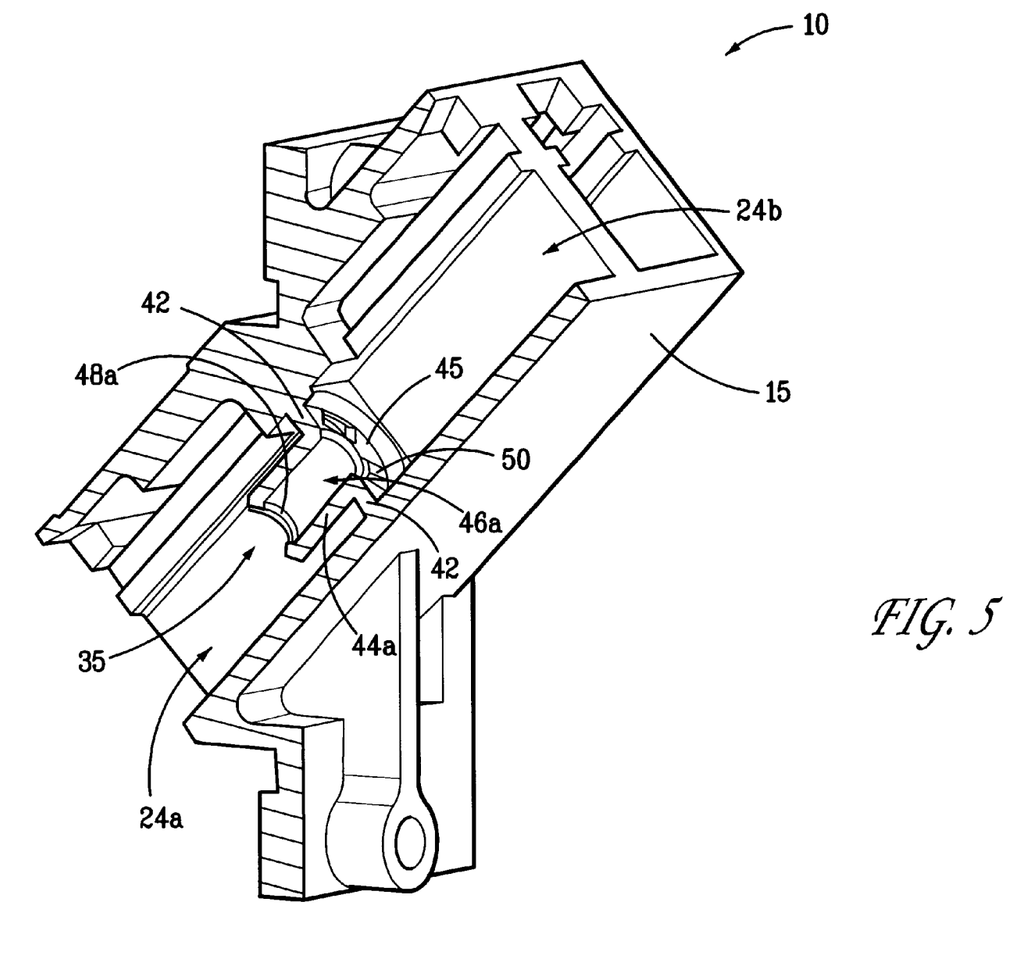
FIG. 5 is another sectional, perspective view of a portion of the adapter shown in FIG. 4.

Cylindrical sidewall 44a, which protrudes outwardly from internal flange 42, forms a bore 46a therethrough enabling communication between cavities 22a and 22b (as well as between cavities 24a and 24b). Retainer 48a protrudes radially inwardly from sidewall 44a at a distal end thereof (that is, opposite flange 42). An outer (that is, opposite internal flange 42) surface of retainer 48a includes an annular bevel 49a. Seat 45 is a recessed portion of flange 42, and apertures 50 are formed through internal flange 42 in seat 45 about the circumference of bore 46a, as best shown in FIGS. 4 and 5.

Insert post 36 includes a cylindrical sidewall 44b, a flange 43, a retainer 48b, and plural tabs or fingers 52. Sidewall 44b forms a longitudinal bore 46b therethrough. Flange 43 extends outwardly from an end of sidewall 44b. Fingers 52 preferably extend longitudinally outwardly from flange 43. Preferably, three or four fingers are employed. Retainer 48b extends radially inwardly from sidewall 44b at or near an end thereof that is opposite flange 43. An outer (that is, opposite internal flange 43) surface of retainer 48b includes an annular bevel 49b.

Alignment sleeve 40 is cylindrical so as to form a bore 46c therethrough, and is configured to be insertable into bores 46a and 46b and to be retained by retainers 48a and 48b, as described more fully below. Preferably, sleeve 40 is a conventional sleeve, such as for example formed of phosphor bronze (preferably for multi-mode operations) or a zirconia ceramic (preferably for single-mode operations), having a tight tolerance for aligning opposing ferrules of the fiber optic connectors. In this regard, because of alignment considerations relative to the small diameters of the operative fiber optic components, such as for example an 8 micron fiber optic core diameter for single mode fibers and a 62.5 micron core diameter of multiple mode fibers, the tolerance of the diameter of bore 46c of alignment sleeve 40 is often approximately one micron or less.

Referring to FIGS. 4 through 9 to describe the assembly of fitting 33, as well as the corresponding method according to another aspect of the present invention, flange 42 and frame post 35, including cylindrical sidewall 44a and retainer 48a, are preferably integrally formed with housing 15 as part of a single casting, such as, for example, die casting of conventional materials as described above. Bore 46a of post 35 receives alignment sleeve 40 therein such that a first end of sleeve 40 contacts an inner portion of retainer 48a.

Insert post 36 is disposed over an opposing second end of sleeve 40 such that frame seat 45 receives insert post flange 43 therein and insert post retainer 48b may lightly contact the end of sleeve 40 or may be disposed proximate the end of sleeve 40 with a clearance therebetween so as to form either a fixed or a floating configuration. Fingers 52 are, thus, inserted and disposed in apertures 50. According to another aspect of the present invention, fingers 52 are deformed or coined so as to couple posts 35 and 36 together. Preferably, surfaces of internal flange 42 proximate apertures 50 opposite seat 45 have a chamfer to receive the deformed or coined portion of fingers 52 such that, after deformation, the ends of fingers 52 form rivets.

Adapter 10, when formed of a conductive material as described above, provides EMI shielding. Such shielding is enhanced by minimizing the openings in adapter 10. In this regard, the maximum opening of conductive material through adapter 10 (that is, the internal diameter of retainers 48a and 48b) preferably is below about 3 mm, and more preferably approximately 1.45 mm. Such dimensions provide shielding while enabling cooperation with conventional alignment sleeves.

Coining tools configured to cooperate with the components described herein may be employed. For example, an anvil (not shown) having a circular opening may be disposed over insert post 36 such that an anvil surface may urge against an outer portion of insert post flange 43 (that is, opposite fingers 52). A coining die (not shown) may be disposed over frame post 35 such that wedges or like deformation elements may urge against the distal tips of fingers 52 so as to deform or coin the fingers. Thus, each of the anvil and the die may have a cut out to receive posts 36 and 35, respectively. Such coining or deforming operations will be apparent to persons familiar with manipulation and fabrication of die cast parts in light of the present disclosure.

Coupling together posts 35 and 36 at ends thereof opposite retainers 48a and 48b enables retainers 48a and 48b to contact or otherwise retain sleeve 40 without coining or modification of the distal ends of posts 35 and 36. In this regard, deforming the posts at a location spaced apart from the sleeve, as well as spaced apart from the portions holding the ends of the sleeve, diminishes the likelihood of damage to the alignment sleeves during assembly of the fitting 33. Such benefit diminishes rejects or damage to the alignment sleeves, which are expensive relative to the entire assembly.

During insertion of a connector 28 into a cavity (for example, 24b), ferrule 31 may contact a bevel (for example, 49b) to facilitate rough alignment and insertion of ferrule 31 into sleeve bore 46c. Because insert sleeve 40 is manufactured to the dimensional accuracy and precision to align connector ferrules 31, frame post 35 and insert post 36 may be formed of a die cast material having tolerances achievable with conventional die casting techniques. Thus, even if sleeve 40 is somewhat misaligned relative to bores 46a and 46b of posts 35 and 36 such that the longitudinal centerline of sleeve 40 is not co-linear or parallel to a longitudinal centerline of the cavity (for example, 24a and 24b), the opposing connectors 28 may still be properly connected through sleeve 40. At a predetermined point in the insertion process, latch 32 moves outwardly to clip into recess 30 to removably affix connector 28 to adapter 10.

The drawings illustrate aspects of the present invention with reference to a particular embodiment. The present invention, in not limited to the particular embodiment disclosed herein, but rather encompasses any configuration in accordance with the principles of the aspects of the invention disclosed herein. For example, the illustrated adapter is configured such that the longitudinal centerline of fiber optic connectors forms a 45 degree angle with the mating surface between the panel and the adapter flange. The present invention, however, encompasses any configuration, including for example any orientation of the longitudinal centerline of fiber optic connectors relative to such mating surface. Further, the figures illustrate the coupling of frame post 35 and insert post 36 by riveted or coined fingers. The present invention encompasses fingers 52 being disposed in frame post 35 and the apertures 50 being formed in insert post 36, rather than as shown in the figures. Further, the present invention encompasses any shape of posts 35 and 36 that are suitable for retainer alignment sleeve 40, as well as any means of fastening posts 35 and 36, including for example rivets 70, screws, nuts and bolts, press fitting, mating threads formed on the components, adhesives, and the like, each of which is generally referred to herein as mechanical coupling.

What is claimed is:

1. A fiber optic adapter assembly mountable through a panel opening on a panel for providing a shielded connection between at least two fiber optic connectors, the adapter assembly comprising:
    an adapter comprising a housing and an insert sleeve, the housing formed of a conductive material and defining at least first and second connector cavities, the first and second connector cavities being disposed on opposite ends of the housing for receiving fiber optic connectors therein, the sleeve supported within the housing for receiving ferrules of the fiber optic connectors therein; and
    a shielding gasket disposed between the adapter housing and the panel;
    whereby the housing inhibits electromagnetic interference leakage through the panel opening and the shielding gasket inhibits electromagnetic interference from leaking between the housing and the panel.

2. The adapter of claim 1 further comprising a flange extending from the housing for coupling with the panel, the shielding gasket being disposed between the flange and the panel.

3. The adapter of claim 2 wherein the gasket is compressible such that the gasket inhibits electromagnetic interference leakage between non-planar portions of the flange and the panel.

4. The adapter of claim 3 wherein the gasket includes conductive particles disposed in a compressible matrix.

5. The adapter of claim 3 wherein the gasket is a silicone elastomer filled with nickel coated graphite carbon particles.

6. The adapter of claim 1 wherein the conductive material comprises zinc.

7. The adapter of claim 1 further comprising a frame post and an insert post, the frame post being integrally formed with the housing, the insert post coupled to the frame post, the alignment sleeve being disposed in bores formed in the frame post and the insert post, the frame post including a retainer extending inwardly toward the frame post bore to secure an end of the alignment sleeve, the insert post including a retainer extending inwardly toward the insert post bore to secure another end of the alignment sleeve.

8. The fiber optic adapter of claim 7 wherein the frame post retainer and the insert post retainer contacting opposing lips of the alignment sleeve for retaining the alignment sleeve within the frame post and the insert post bore.

9. The adapter of claim 1 wherein the housing and the frame post are integrally die cast.

10. The adapter of claim 1 further comprising a latching recess formed in the housing.

11. The adapter of claim 10 wherein the latching recess extends through a wall of the housing.

12. A fiber optic adapter comprising:
    a housing including a frame post, the housing defining at last first and second connector cavities that are open at opposite ends of the housing for receiving fiber optic connectors therein, the frame post defining a bore therein and including a retainer extending inwardly toward the frame post bore, the frame post integrally connected to the housing such that electromagnetic interference is inhibited from leaking between the frame post and the housing;
    an insert post defining a bore therein, the insert post coupled to the frame post such that the frame post bore and the insert post bore are in communication, the insert post including a retainer extending inwardly toward the insert post bore;
    an alignment sleeve disposed within the insert post bore and the frame post bore for receiving ferrules of the fiber optic connectors therein; the alignment sleeve being secure between the frame post retainer and the insert post retainer.

13. The fiber optic adapter of claim 12 wherein the housing and the frame post are integrally die cast of a material comprising a metal, and the insert post is formed of a similar material.

14. The fiber optic adapter of claim 12 wherein the frame post and the insert post are coupled together with fasteners.

15. The fiber optic adapter of claim 14 wherein the fasteners include rivets.

16. The fiber optic adapter of claim 12 wherein the frame post includes an outer flange and the insert post includes an outer flange, the insert post outer flange including fingers extending therefrom extending into apertures formed in the frame post outer flange, the fingers being deformed at distal ends thereof so as to couple the frame post outer flange and the insert post outer flange together.

17. The fiber optic adapter of claim 12 wherein each one of the frame post and the insert post are generally tubular.

18. A fiber optic adapter mountable through a panel opening on a panel for connecting at least two fiber optic connectors, the adapter comprising:
    a housing formed of a conductive material and defining at least first and second connector cavities being disposed on opposite ends of the housing, the housing including a flange for securing the adapter to the panel;
    a multi-piece fitting assembly disposed within the housing between the first and second connector cavities, the fitting assembly including a pair of members mechanically coupled together and retaining an alignment sleeve therebetween, and
    a compressible gasket formed of a conductive material disposed on the flange of the housing;
    whereby the housing, the gasket and the flange inhibit electromagnetic interference leakage through the panel.

19. The fiber optic adapter of claim 18 wherein each end of the fitting assembly includes a bevel for facilitating insertion of a portion of the fiber optic adapter into the fitting assembly.

20. A method of forming a fiber optic adapter comprising the steps of:
    (a) providing a conductive housing including first and second cavities fanned therein, and a frame post formed between the first and second cavities, the frame post including apertures fanned therein;
    (b) inserting an alignment sleeve into a bore of the frame post;
    (c) inserting an insert post having fingers over the alignment sleeve; and
    (d) mechanically coupling the frame post and the insert post together by inserting the fingers of the insert post into the apertures of the frame post and deforming the fingers to secure the alignment sleeve therebetween, such that a first fiber optic connector ferrule is insertable into a first end of the alignment sleeve and a second fiber optic connector ferrule is insertable into an opposing second end of the alignment sleeve so as to operatively connect the first and second fiber optic connector ferrules.

21. The method of claim 20 wherein the coupling step includes a first fiber optic connector ferrule being insertable into a first end of the alignment sleeve and a second fiber optic connector ferrule being insertable into an opposing second end of the alignment sleeve so as to operatively connect the first and second fiber optic connector ferrules.

22. The method of claim 20 wherein the providing step includes providing a die cast conductive housing.

23. The method of claim 20, wherein deforming the fingers includes forming the fingers into rivets.

* * * * *